Feb. 28, 1928.
E. BUCKINGHAM
1,660,915
INTERNAL GEAR GENERATING MACHINE
Filed Aug. 22, 1923
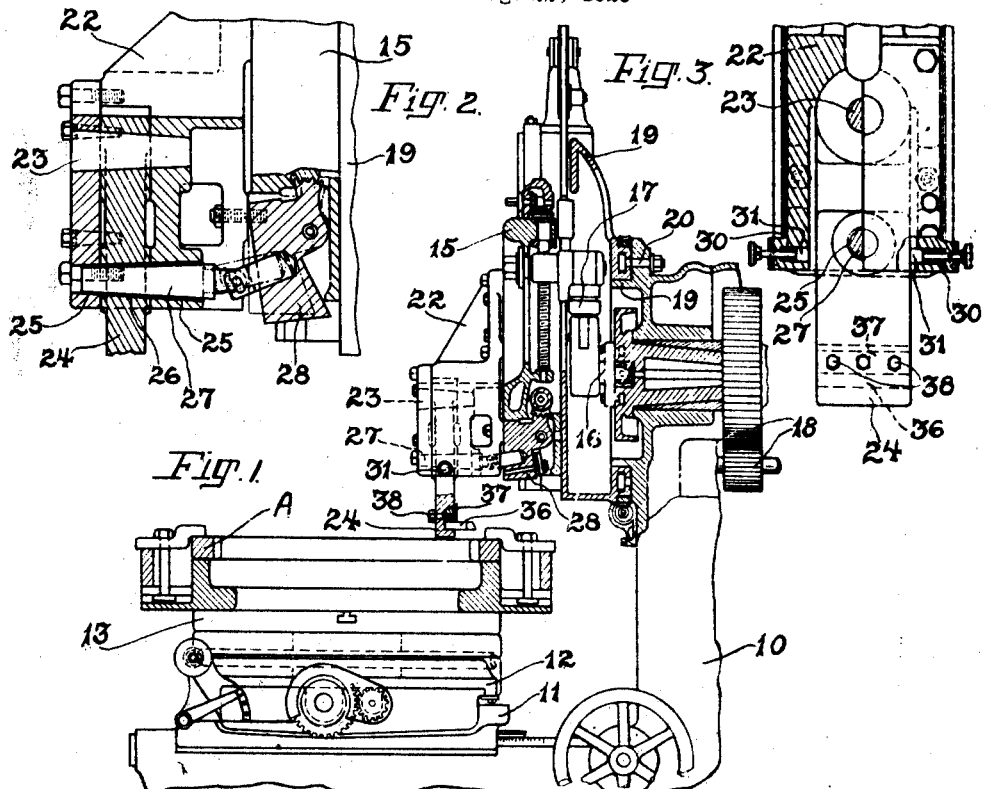
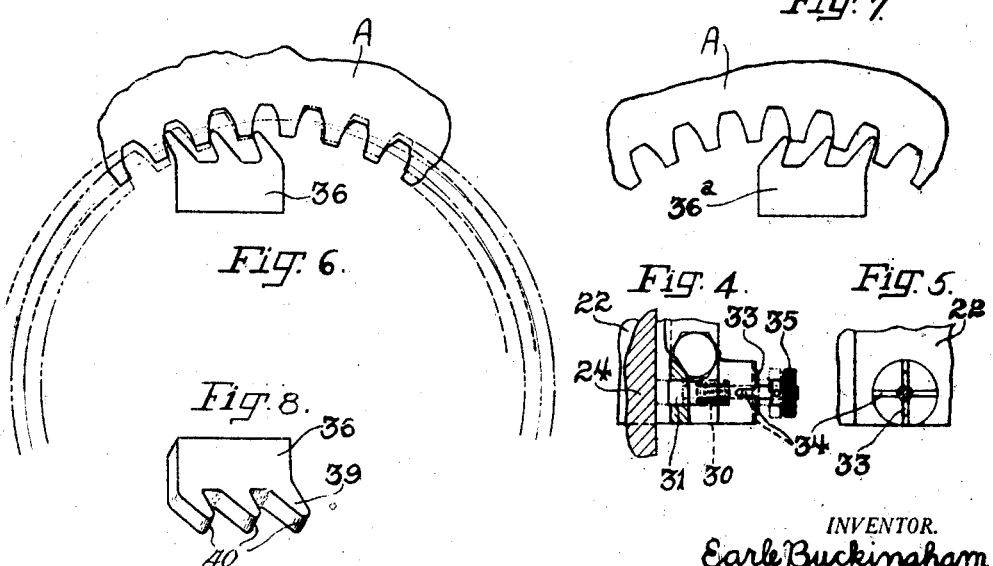
INVENTOR.
Earle Buckingham
BY
ATTORNEY Patented Feb. 28, 1928.

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

INTERNAL-GEAR-GENERATING MACHINE.

Application filed August 22, 1923. Serial No. 658,758.

This invention relates to a device for generating tooth curves on internal gears.

An object of the present invention is to provide a machine, or an attachment adapted to be employed in connection with a machine, whereby the tooth curves of internal gears may be rapidly generated to a high degree of precision.

One feature which enables me to accomplish the above object is that I provide means adapted to be utilized in connection with a machine such as that shown in the Patent to Maag, 1,290,270, granted January 7, 1919.

Another feature which is advantageous is that I utilize a cutter formed with a plurality of obliquely extending teeth so that it is adapted to cut a plurality of teeth of the internal gear simultaneously.

Another object of the invention is to provide actuating mechanism for reciprocating the cutter, these being arranged so that the cutter may be suitably withdrawn from contact with the work upon its return or inactive stroke.

With these and other objects in view, my invention consists in the features of construction and operation set forth in the following specification and illustrated in the accompanying drawing.

In the accompanying drawing annexed hereto and forming a part of this specification, I have shown my invention as forming an attachment to a gear generating machine, but it will be understood that the drawing is not to be construed as defining or limiting the scope of the invention, the claims appended to this specification being relied upon for that purpose.

In the drawing:

Figure 1 is a side view in section of a portion of a machine such as that described in the above mentioned patent showing my attachment applied thereto.

Fig. 2 is a sectional view upon an enlarged scale showing the means for actuating parts of the attachment.

Fig. 3 is a front view of the parts shown in Fig. 2, one half being shown in section.

Fig. 4 is a detail of the present invention.

Fig. 5 is a side view of the same.

Fig. 6 is a diagrammatic view showing the relative positions of the cutter and work.

Fig. 7 shows a diagrammatic view of a cutter adapted to generate the opposite sides of the teeth shown in Fig. 6, and Fig. 8 is a detail view of a tool forming a part of the invention.

In the above mentioned drawing, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: First, a body member adapted to be directly attached to the reciprocatory ram of a machine for generating tooth curves such as that shown in the above mentioned patent; second, an arm thereon adapted to oscillate about an axis normal to the direction of reciprocation of the ram; third, a tapered pin adapted to enter a conical recess formed within the body member and the oscillating arm; fourth, means to actuate the tapered pin so that during movement of the ram in one direction it prevents any oscillation of the arm and in the opposite direction permits a slight lateral oscillation thereof; fifth, springs disposed on opposite sides of the body member and adapted to contact with opposite sides of the arm, means being associated with these springs so that one or the other of them may be rendered inoperative; sixth, a cutter secured to the free end of the oscillating arm and preferably having a plurality of teeth adapted to simultaneously engage different portions of different teeth on the blank being formed.

Referring more in detail to the figures of the drawing, I show the invention applied as an attachment to a generating machine for spur and helical gears. This machine comprises a base 10 and a saddle 11 adapted to be positioned adjustably relative to the base. On the saddle 11 is a reciprocatory slide 12, this slide 12 carrying a rotating table 13 thereon. By suitable mechanism described fully in the above mentioned patent, simultaneous movements may be given to the reciprocatory slide 12 and rotating table 13 so that a rolling movement of the blank A on the table 13 may be effected, this rolling movement being of any predetermined type dependent on the ratio of the gearing by means of which the slide 12 and table 13 are actuated. As these means are defined in the above mentioned patent, further description is thought unnecessary. It will be sufficient to state that by suitably actuating the slide and table, a blank A of any diameter fastened centrally to the table can be given a movement as if it were being rolled along a straight edge.

Also forming part of the machine is a ram 15 adapted to be reciprocated in a vertical plane by means of suitable actuating means as for instance a crank 16 and connecting rod 17 as shown in Fig. 1. These may be actuated by the gearing 18 shown so that the ram 15 may be rapidly reciprocated. Suitable adjusting means are provided to vary the stroke and position of the ram during its operation depending upon the size and position of the blank being acted upon. Preferably also the ram is mounted upon a swivelling head 19 so that it may be angularly adjusted about the central hub 19 and securely fastened in adjusted position by the bolts 20.

Adapted to be securely attached to the front surface of the ram is a body member 22, this, as shown, being provided with a pin 23 which serves as a pivotal mounting for an arm 24 suspended therefrom. Near its lower end, the body member 22 is provided with tapered holes 25 in alignment with a tapered hole 26 formed in the arm 24. Adapted to enter these holes 25 and 26 is a tapered pin 27 adapted to be actuated axially by means within the body member. It will be understood from this, particularly by referring to Fig. 2, that in its withdrawn position the tapered pin 27 permits a slight lateral oscillation of the arm 24, while in its advanced or forward position, the tapered pin 27 closely engages the aligned orifices or holes 25 and 26 in the body member 22 and arm 24 thus preventing any oscillation of the arm 24 relative to the body member 22.

In order to actuate the tapered pin 27 so that during the downward or cutting stroke of the ram 15 the tapered pin will be in its advanced position and during the upward movement of the ram in its retracted position, I attach the rear end of the tapered pin by means of a pin and slot connection to an oscillating member 28 formed within the ram 15. This member 28 is oscillated in timed relation to the movements of the arm as will be seen by an examination of the above mentioned patent.

Positioned on opposite sides of the body member 22 are coiled springs 30 each of which is adapted to press against a plunger 31 which in turn bears against one side of the oscillating arm 24. If one of the springs 30 is permitted to expand it will therefore urge the arm 24 to oscillate in one direction when the tapered pin 27 is retracted to permit this movement. As but one of these springs 30 can be made use of at one time, I provide a transverse pin 33 in the plunger 31 which in one position may enter a slot 34 formed in the side of the body member thus permitting the plunger 31 to move forward against the arm 24 as the spring 30 expands. By withdrawing the plunger 31 manually by its knurled head 35, the transverse pin 33 may be positioned to withhold the plunger 31 from any engagement with the arm 24. In this way, by permitting but one of the plungers 31 to contact with the arm 24 and withholding the other in its retracted position, an oscillatory movement of the arm 24 is accomplished during the upward or inactive stroke of the ram 15 during which stroke the tapered pin 27 is withdrawn as shown in Fig. 2. This oscillatory movement will of course be limited by the amount the tapered pin 27 is withdraw out of contact from the hole 26 in the oscillating arm 24. This movement of the arm is designed to be sufficient to withdraw the cutting tool 36 from contact with the work A during its upper or inactive stroke.

The movement of the arm accomplished by one of the springs 30 is in a direction tangent to the periphery of the blank and also normal to the direction of movement of the ram 15 and cutter 36. It will be understood that when a cutter of the form required to cut the opposite sides of the teeth and when one of the opposite form is mounted on the arm 24, the positions of the springs will be changed accordingly. The movement induced by the opposite spring will cause the arm 24 to be oscillated slightly in the opposite direction.

Attaching means are provided adjacent the lower end of the arm 24 adapted to maintain a cutting tool 36 in fixed position. This attaching means may be in the form of a wedge 37 adapted to clamp the tool 36 by means of the screws 38 as shown. The cutter 36 itself comprises a thick or heavy plate having a plurality of extensions 39 formed thereon. These extensions 39 are formed obliquely along one face of the cutter 36 and are adapted to engage the tooth curves of the blank A being formed at or near their forward ends. The forward ends of the projections 39 are curved to a predetermined small radius as shown at 40 and the corresponding sides of the projections 39 are recessed sufficiently so that no cutting action takes place except upon portions 40 of the cutter at the outer ends of the extensions. It will be understood of course that a cutter such as shown in Fig. 8 can cut but one side of the tooth curves on an internal gear and that in order to cut the opposite sides, another cutter 36ª having teeth oppositely disposed as shown in Fig. 7 must be used.

By reference to Fig. 6, the operation of the invention will be more clearly understood. The blank A, as above described, is moved relative to the reciprocatory ram 15 between each downward movement thereof so that the cutting surfaces of the cutter will engage slightly different points in the tooth curves. This movement of the blank A comprises a rolling movement as if it were being rolled upon its pitch diameter along a straight edge. After this rolling action has taken place a number of times and one of the cutting teeth of the cutter 36 has been advanced relative to the blank A so that it is cutting to the full depth of the teeth, the blank A is indexed in any appropriate manner presenting additional teeth to be formed by the cutter 36. This indexing movement may be in every way identical to that described in the above mentioned patent so that a description thereof will not be required to be given.

What I claim is:

1. A machine for generating tooth curves on internal gears comprising in combination, a base, means to effect a rolling motion of a blank mounted thereon, a cutter adapted to engage an internal surface of said blank, means to reciprocate said cutter, and means to move said cutter laterally into and out of engagement with the blank.

2. A machine for generating tooth curves on internal gears comprising in combination, a base, means to effect a rolling motion of a blank mounted thereon, a reciprocatory ram on said base, a laterally movable arm on said ram, a cutter at one end adapted to engage an internal surface of said blank, and means to actuate said ram and arm, whereby the cutter may engage the gear during the stroke of the ram in one direction and be disengaged therefrom during the stroke in the opposite direction.

3. A machine for generating tooth curves on internal gears comprising in combination, a base, means to effect a rolling motion of a blank mounted thereon, a reciprocatory ram on said base, a pivotally mounted arm on said ram, a cutter at its free end adapted to simultaneously engage a plurality of internal surfaces of teeth on said gear, and means permitting oscillation of said arm while the ram is moving in one direction, whereby the cutter may engage the gear during the stroke of the ram in one direction and be disengaged therefrom during the stroke in the opposite direction.

4. A machine for generating tooth curves on internal gears comprising in combination, a base, means to effect a rolling motion of a blank mounted thereon, a reciprocatory ram on said base, a pivotally mounted arm on said ram, a cutter at its free end adapted to simultaneously engage a plurality of internal surfaces of teeth on said gear, and means preventing oscillation of said arm while the ram moves in one direction and permitting it to oscillate during movement of the ram in the opposite direction, whereby the cutter may engage the gear during the stroke of the ram in one direction and be disengaged therefrom during the stroke in the opposite direction.

5. A machine for generating tooth curves on internal gears comprising in combination, a base, means to effect a rolling motion of a blank mounted thereon, a reciprocatory ram on said base, a pivotally mounted arm on said ram, a cutter at its free end, a tapered pin on said ram adapted to engage a conical surface in said arm, and means to actuate said pin to alternately prevent and permit oscillation of said arm during reciprocations of said ram.

6. A machine for generating tooth curves on internal gears comprising in combination, a base, means to effect a rolling motion of a blank mounted thereon, a reciprocatory ram on said base, a pivotally mounted arm on said ram, a cutter at its free end, a tapered pin on said ram adapted to engage a conical surface in said arm, means to actuate said pin to permit oscillation of said arm during a portion of the movement of the ram, and a spring on one side of said ram engaging said arm to oscillate the arm.

7. A machine for generating tooth curves on internal gears comprising in combination, a base, means to effect a rolling motion of a blank mounted thereon, a reciprocatory ram on said base, a pivotally mounted arm on said ram, a cutter at its free end, a tapered pin on said ram adapted to engage a conical surface in said arm, means to actuate said pin to permit oscillation of said arm during a portion of the movement of the ram, springs on opposite sides of said ram and adapted to engage said arm, and means to render one or the other of said springs inoperative to oscillate the arm.

8. An attachment for gear cutting machines comprising in combination, a body member adapted to be attached to the ram of a gear cutting machine, an arm pivotally mounted on said body member, a cutting tool having a plurality of arcuate cutting edges at its free end, a tapered pin adapted to be moved relative to the body member and adapted to engage the arm whereby in one position of the pin the arm is restrained from oscillating and in its other position the arm may have a limited free oscillation.

In testimony whereof, I hereto affix my signature.

EARLE BUCKINGHAM.